Feb. 9, 1943.    J. MERCIER    2,310,802
BRAKE MECHANISM
Filed April 15, 1939
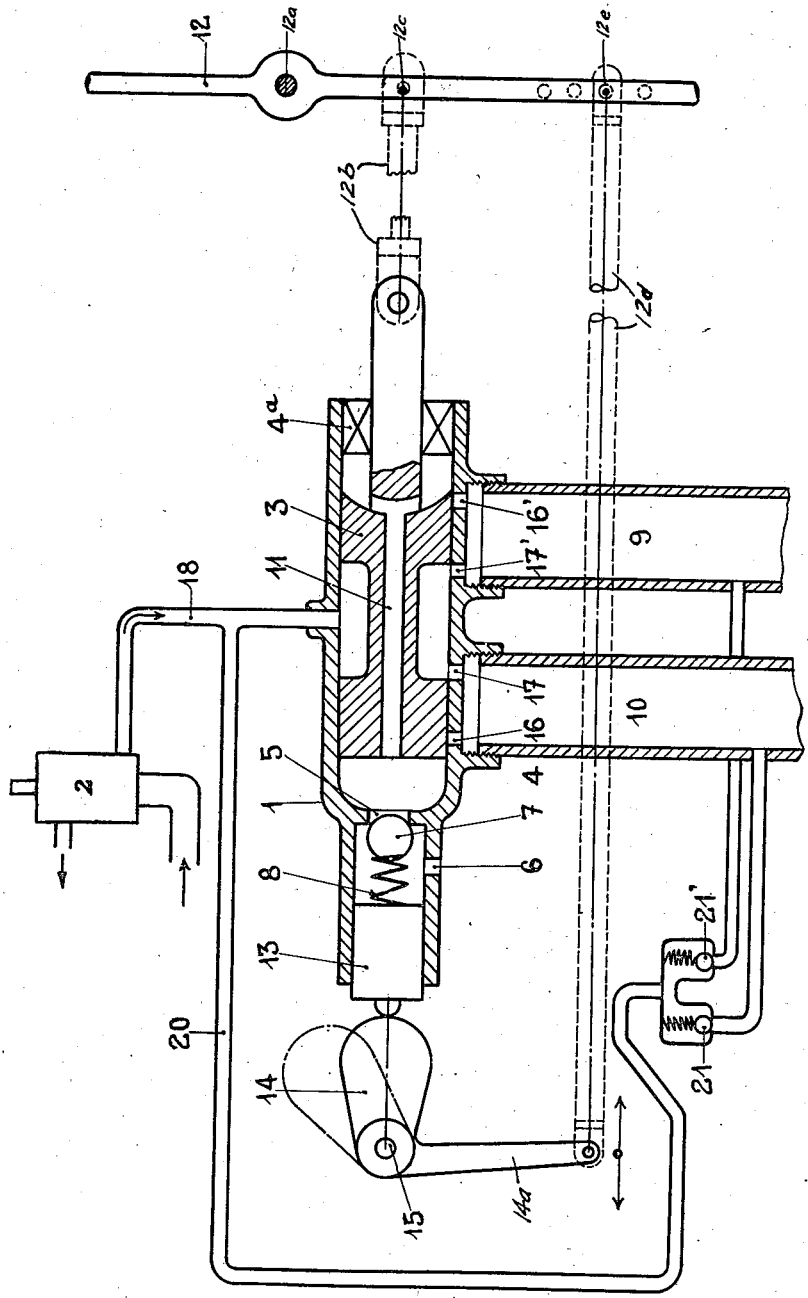
INVENTOR
Jean Mercier
By
Watson, Cole, Grindle & Watson
ATTYS.

Patented Feb. 9, 1943

2,310,802

UNITED STATES PATENT OFFICE 2,310,802

BRAKE MECHANISM

Jean Mercier, Paris, France; vested in the Alien Property Custodian

Application April 15, 1939, Serial No. 268,094
In Great Britain April 27, 1938

6 Claims. (Cl. 303—6)

This invention relates to brake mechanism for vehicles and more particularly to brake controlling mechanism for aeroplanes, caterpillars, or the like.

In order to turn on the ground with an aeroplane, a caterpillar or similar vehicles having brakes on both sides, it is necessary that the pilot be able to release the brake on the outside of the turn to be made and simultaneously to apply the brake on the opposite side. In aeroplanes the swingle-bar which controls the vertical rudder generally serves also to distribute the braking action; when said swingle-bar is turned in one direction it increases the braking action of one of the brakes and simultaneously reduces the braking action of the symmetrical brake.

The brakes generally used in these cases are actuated by fluid pressure and heretofore the fluid passed through pressure reducing means and then through a distributor controlled by the pilot before entering a second distributor which directed it to the brakes at both sides of the vehicle. In certain of these brakes in which the fluid is led directly from the distributor to the braking members the variations in the braking action are very sudden.

To overcome this difficulty and obtain a progressive braking and releasing action of the brakes it has been proposed to dispose between a main pressure reducing device and the brakes, two supplementary pressure reducing devices disposed at each side of the vehicle. It will be apparent, however, that this complicates the mechanical structure and reduces to that extent its reliability in operation.

One of the objects of the present invention is to provide an arrangement whereby a smooth, progressive action of the brakes is obtained without the assistance of pressure reducing means disposed between a main pressure releasing means and the brakes. In the illustrative embodiment of the invention to be described this result is obtained by controlling the cross section of the outlet of the distributor, preferably by acting on the means for closing said outlet.

In accordance with the present invention this action on or control of the outlet of the distributor may be made automatically by connecting said closing member of said outlet passage to the brake operating mechanism, so that operation of the latter will simultaneously effect said control of said outlet passage, that is to say of the cross section thereof. Where the brake mechanism comprises a swingle-bar, and where said closing means is subjected on one side to the pressure of the compressed fluid, this member is, according to the invention, connected at the other side to the said swingle-bar in such manner that the outlet section of said opening, which influences the intensity of release, varies automatically as a function of the inclination of said swingle-bar.

In the illustrative embodiment of the invention hereinafter described, the distributor is of the slide valve type, but it will be understood that the invention is not limited to any particular type of distributor. Suitable means is provided in accordance with the invention for operating the distributor, herein by moving the movable member or slide valve thereof. For example, said distributor operating means may be the swingle-bar. The latter may thus operate the two devices either from one point or from a different point. In order to be able to regulate the section of the distributor outlet at will for a movement of the movable member of the distributor, a movement which cannot be modified since it depends on structural dimensions, the point of connection of said swingle bar with the closing member operating means may be made adjustable lengthwise of said swingle-bar.

The invention and its aims and objects will be readily understood from the following description of one embodiment of the invention herein given for illustrative purposes, taken in connection with the accompanying drawing, partly diagrammatic, of said illustrative embodiment, the true scope of the invention being more particularly pointed out in the appended claims.

The distributor may and preferably will be of the type shown in Fig. 1 of my copending U. S. A. application Serial No. 203,849 filed on April 23, 1938, to which reference may be had for a more detailed description. In the illustrative embodiment of the invention said distributor comprises a cylindrical slide valve 3 adapted to be moved in a cylinder 4 closed at the right end by a stuffing box 4a and having at the left an outlet passage 5, 6 adapted to be closed by suitable closure means herein a ball 7 pressed against said opening 5 by a spring 8. Connection between the distributor and the brakes at both sides of the vehicle is established by two passages 9 and 10, respectively, leading to said cylinder 4, each by two orifices 16—17 and 16'—17'. Compressed fluid can be supplied to said distributor for applying the brakes through a conduit 18 from any suitable source not shown, and through any conventional or other suitable valve 2, adapted to connect said conduit either to said source or to an outlet or return port or conduit and preferably adapted to reduce the pressure of the fluid supplied from the source to said conduit, as is well known in the art. A conduit 11 extends axially through said slide 3 and connects with one another the two ends of the cylinder in which there exists the same pressure. By movement of said slide 3, therefore, the brakes can be put in communication simultaneously with said supply passage 18 or one in communication with said outlet passage and the other simultaneously with said supply passage.

At the right said slide valve 3 is operatively connected to means for operating the brakes, said means being herein illustratively shown in the form of a swingle-bar 12 having a connecting rod or link 12b pivoted at 12c. At the left the closure means for the outlet passage 5, 6 is shown, said means consisting of a ball 7. Means are provided for controlling the closing action of said ball, said controlling means herein illustratively comprising a spring 8 bearing on a piston 13 and a cam 14 against which said piston 13 abuts under the action of said spring 8, said cam having an arm 14a connected by a rod or link 12d to a suitable point 12e of the bar 12. In the illustrative embodiment of the invention, there are thus two different points on said swingle-bar from one of which said swingle-bar operates the slide valve and from the other of which it controls said outlet 5, 6. Operation of said swingle-bar about its pivot 12a in the plane of the drawing thus causes said cam 14 to swing automatically about its axis 15 and move said piston 13 longitudinally to produce a variation in the tension of said spring 8 and consequently a change in the equilibrium between the compressed fluid pressure in the cylinder 4 and the opposing action of the spring 8.

When the cylinder 4 has been supplied with compressed fluid for applying the brakes and when, consequent upon swinging movement of said cam 14 by movement of said swinging bar said piston 13 slides toward the left, said spring 8 will be extended to a point where it yields under the pressure in the cylinder 4, so that a certain quantity of compressed fluid escapes through the outlets 5 and 6 from the brakes when the pressure of the spring 8 has become less than the pressure in the brake which is connected to said outlet. At this time the slide is in a position wherein communication is established between the compressed fluid supply passage 18 and the other symmetrical brake.

Thus the pilot or other operator when he actuates said swingle-bar and thus moves the slide valve 3 of the distributor to open or close the conduits 9 and 10 of the left or right hand brake, as the case may be, thus effecting an increase in the braking action on one side of the vehicle and a reduction in the braking action on the other side thereof, simultaneously causes a variation in the pressure exerted on the outer side of the ball valve 7, thus producing a progressive expansion of the compressed fluid contained in one or the other of the brakes. The direct escape of the fluid pressure from the brakes is thus varied or regulated gradually, which renders progressive, as a function of the inclination of said swingle-bar, the releasing action of the brake upon the wheel located on the outside of the turn which it is desired to make.

In accordance with the invention there may be provided a branched passage 20 leading from the supply passage 18 to the two passages 9 and 10 and completely by-passing said distributor 1, said passage 20 being provided with check valves 21, 21' which are maintained closed by the pressure of the supply of compressed fluid so long as the latter reaches said distributor. Said branch passage 20 serves to empty the brakes quickly of fluid pressure, so soon as the pilot or other operator of the brakes cuts off the compressed fluid supply from the distributor. As soon as this happens, the fluid pressure in the brakes raises the valves 21, 21' and puts the brakes in direct communication with the atmosphere by way of the opening in the control valve 2. The latter may be of any suitable type as, for example, illustrated and described in United States Patent 1,526,452, granted February 17, 1925, or United States Patent 1,541,913, granted June 16, 1925. Such valves are adapted, normally, to maintain the brakes in communication with the atmosphere and, when actuated to admit pressure to the brakes, are adapted first to close the communication between the brakes and the atmosphere, and then to place the brakes in communication with the source of pressure fluid.

I am aware that my invention may be embodied in other specific forms without departing from the spirit or essential attributes thereof, and I therefore desire the present embodiment to be considered in all respects as illustrative and not restrictive, reference being had to the appended claims rather than to the foregoing description to indicate the scope of the invention.

I claim:

1. Distributor system for two fluid pressure actuated brakes comprising one supply and exhaust line for fluid under pressure communicating with a valve body, two conduits for supply and exhaust of fluid pressure to and from said brakes, each conduit communicating with said valve body through a pair of openings, valve means inside said valve body, an exhaust port in said valve body, and means for operating said valve-means from the outside, said valve means being adapted to afford communication, in its neutral position, between said line and two openings, each communicating with one of said conduits, while obstructing the remaining openings, and, when displaced from its neutral position, to restrict progressively the communication between said line and one of said conduits and simultaneously to afford, progressively, communication between said one conduit and said exhaust port, without affecting the condition of the other conduit.

2. Distributor system for two fluid pressure actuated brakes comprising one supply and exhaust line for fluid under pressure abutting on a cylindrical chamber, two conduits for supply and exhaust of fluid pressure to and from said brakes, each communicating with said chamber through a pair of openings, an exhaust port in said chamber, a piston-like member sliding in said chamber provided in its central part with an annular passage, an axial passage inside said member permitting fluid to flow towards said exhaust port, and means for operating said member from the outside, said member being adapted to afford communication, in its neutral position, between said line and two adjacent openings, each communicating with one of said conduits, while obstructing the two remaining openings, and, when displaced from its neutral position, to restrict progressively the communication between said line and one of said conduits and simultaneously to afford, progressively, communication between said one conduit and said exhaust port, without affecting the condition of the other conduit.

3. Distributor system according to claim 1 in which said exhaust port is controlled by a spring loaded valve.

4. Distributor system according to claim 1 in which said exhaust port is controlled by a spring loaded valve, the pressure of the spring being controlled by a cam.

5. Distributor system according to claim 1 in which said exhaust port is controlled by a spring loaded valve, the pressure of the spring being controlled by a cam, said cam being pivoted at a point outside said valve body and operatively connected to said means for operating said valve means from the outside, so as to compress said spring most when said valve means is in its neutral position and to progressively release said spring by turning to either side when said valve means is displaced from its neutral position.

6. Distributor system for two fluid pressure actuated brakes according to claim 1 in which each of said conduits is connected to said supply and exhaust line by a separate pipe, independent from said valve body and valve means, and including a spring loaded check valve, whereby fluid is prevented from flowing from said line into said conduits but is admitted from either of said conduits into said line whenever the pressure in said conduit is higher than the combined pressure of said spring acting on the respective check valve and the fluid in said supply and exhaust line.

JEAN MERCIER.